US011336541B2

(12) United States Patent
Ritter

(10) Patent No.: US 11,336,541 B2
(45) Date of Patent: May 17, 2022

(54) REAL-TIME ENRICHMENT FOR DEEP PACKET INSPECTION

(71) Applicant: Charter Communications Operating, LLC, St. Louis, MO (US)

(72) Inventor: Jared Ritter, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/020,169

(22) Filed: Sep. 14, 2020

(65) Prior Publication Data

US 2022/0086065 A1   Mar. 17, 2022

(51) Int. Cl.
| | |
|---|---|
| *H04L 12/26* | (2006.01) |
| *H04L 43/028* | (2022.01) |
| *H04L 101/622* | (2022.01) |
| *H04L 29/06* | (2006.01) |
| *H04L 41/22* | (2022.01) |
| *G06K 9/62* | (2022.01) |
| *H04L 41/16* | (2022.01) |
| *G06N 20/00* | (2019.01) |

(52) U.S. Cl.
CPC .......... *H04L 43/028* (2013.01); *G06K 9/6256* (2013.01); *G06N 20/00* (2019.01); *H04L 41/16* (2013.01); *H04L 41/22* (2013.01); *H04L 61/6022* (2013.01); *H04L 63/1425* (2013.01)

(58) Field of Classification Search
CPC ... H04L 43/028; H04L 61/6022; H04L 41/22; H04L 41/16; H04L 63/1425; G06K 9/6256; G06N 20/00
See application file for complete search history.

(56) References Cited

U.S. PATENT DOCUMENTS

| | | | | |
|---|---|---|---|---|
| 9,210,102 B1* | 12/2015 | Wise | ................... | H04L 41/5051 |
| 2012/0284212 A1* | 11/2012 | Lin | ........................ | G06N 20/00 |
| | | | | 706/12 |
| 2013/0347103 A1* | 12/2013 | Veteikis | ................. | H04L 43/04 |
| | | | | 726/22 |
| 2014/0149569 A1* | 5/2014 | Wittenstein | ............ | H04L 43/12 |
| | | | | 709/224 |
| 2014/0317278 A1* | 10/2014 | Kersch | .................... | H04L 67/22 |
| | | | | 709/224 |
| 2015/0150079 A1* | 5/2015 | Hyatt | .................... | H04L 43/045 |
| | | | | 726/1 |

(Continued)

*Primary Examiner* — Michael Won
(74) *Attorney, Agent, or Firm* — Withrow & Terranova, PLLC

(57) ABSTRACT

Real-time enrichment for deep packet inspection is disclosed. A flow identifier iteratively accesses records generated in response to actions by a plurality of computing devices that are communicating through a same gateway router. Each record identifies a device identifier of a corresponding computing device of the plurality of computing devices. A subset of computing devices of the plurality of computing devices is identified based on a criterion. Device identifier information comprising device identifiers that identify the subset of computing devices is generated, each device identifier corresponding to one of the computing devices in the subset of computing devices. The device identifier information is provided to a deep packet inspector that monitors the gateway router and captures packets communicated through the gateway router based on the device identifiers.

19 Claims, 9 Drawing Sheets

(56) References Cited

U.S. PATENT DOCUMENTS

| | | | |
|---|---|---|---|
| 2015/0180774 A1* | 6/2015 | Loach | H04L 41/145 |
| | | | 370/392 |
| 2016/0006753 A1* | 1/2016 | McDaid | H04L 63/1425 |
| | | | 726/23 |
| 2016/0006755 A1* | 1/2016 | Donnelly | H04L 63/1441 |
| | | | 726/1 |
| 2017/0134957 A1* | 5/2017 | Gupta | H04W 12/12 |
| 2018/0103011 A1* | 4/2018 | Li | H04L 47/2475 |
| 2019/0089748 A1* | 3/2019 | Manor | H04W 28/18 |
| 2019/0380037 A1* | 12/2019 | Lifshitz | H04L 43/12 |

* cited by examiner

84 ⟶

| | |
|---|---|
| 86-1 | TIMESTAMP |
| 86-2 | DEVICE NAME |
| 86-3 | AP IP ADDR |
| 86-4 | AP MAC ADDR |
| 86-5 | MAC ADDRESS |
| 86-6 | APPLICATION |
| 86-7 | PACKET TYPE |
| 86-8 | DOWNLOAD BYTES COUNT |
| 86-9 | UPLOAD BYTES COUNT |
| 86-10 | RETRANSMITTED PACKETS |

REAL-TIME ENRICHMENT FOR DEEP PACKET INSPECTION

BACKGROUND

A deep packet inspector (DPI) monitors a communication medium and extracts packets being communicated over the communication medium based on one or more criteria. A DPI is typically manually configured with the desired criterion for a particular purpose, and the configuration remains static. If the criterion changes, the DPI is again manually configured with the new criterion.

SUMMARY

The embodiments disclosed herein relate to real-time enrichment for deep packet inspection by a deep packet inspector (DPI). The embodiments include a flow identifier that recognizes new packet flows that are to be captured by the DPI, and also recognizes random changes to attributes of packets that would cause the DPI to miss (i.e., not capture) packets in a packet flow that the DPI had previously captured.

In one embodiment a method is provided. The method includes iteratively accessing records generated in response to actions by a plurality of computing devices that are communicating through a same gateway router, each record identifying a device identifier of a corresponding computing device of the plurality of computing devices. The method further includes identifying, based on the records, a subset of computing devices of the plurality of computing devices based on a criterion. The method further includes generating device identifier information comprising device identifiers that identify the subset of computing devices, each device identifier corresponding to one of the computing devices in the subset of computing devices. The method further includes providing the device identifier information to a deep packet inspector that monitors the gateway router and captures packets communicated through the gateway router based on the device identifiers.

In another embodiment a computing device is provided. The computing device includes a memory, and a processor device coupled to the memory. The processor device is configured to iteratively access records generated in response to actions by a plurality of computing devices that are communicating through a same gateway router, each record identifying a device identifier of a corresponding computing device of the plurality of computing devices. The processor device is further configured to identify, based on the records, a subset of computing devices of the plurality of computing devices based on a criterion. The processor device is further configured to generate device identifier information comprising device identifiers that identify the subset of computing devices, each device identifier corresponding to one of the computing devices in the subset of computing devices. The processor device is further configured to provide the device identifier information to a deep packet inspector that monitors the gateway router and captures packets communicated through the gateway router based on the device identifiers.

In another embodiment a non-transitory computer-readable storage medium is provided. The non-transitory computer-readable storage medium includes executable instructions configured to cause a processor device to iteratively access records generated in response to actions by a plurality of computing devices that are communicating through a same gateway router, each record identifying a device identifier of a corresponding computing device of the plurality of computing devices. The executable instructions are further configured to cause the processor device to identify, based on the records, a subset of computing devices of the plurality of computing devices based on a criterion. The executable instructions are further configured to cause the processor device to generate device identifier information comprising device identifiers that identify the subset of computing devices, each device identifier corresponding to one of the computing devices in the subset of computing devices. The executable instructions are further configured to cause the processor device to provide the device identifier information to a deep packet inspector that monitors the gateway router and captures packets communicated through the gateway router based on the device identifiers.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 5 is a block diagram of a summary usage record format according to one embodiment;

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

A deep packet inspector (DPI) monitors a communication medium and extracts packets being communicated over the communication medium based on one or more criterion. A DPI is typically manually configured with the desired criterion for a particular purpose, and the configuration remains static. If the criterion changes, the DPI is again manually configured with the new criterion.

The embodiments disclosed herein relate to real-time enrichment for deep packet inspection by a DPI. The embodiments include a flow identifier that recognizes new packet flows that are to be captured by the DPI, and also recognizes random changes to attributes of packets that would cause the DPI to miss (i.e., not capture) packets in a packet flow that the DPI had previously captured.

Figure 1A:
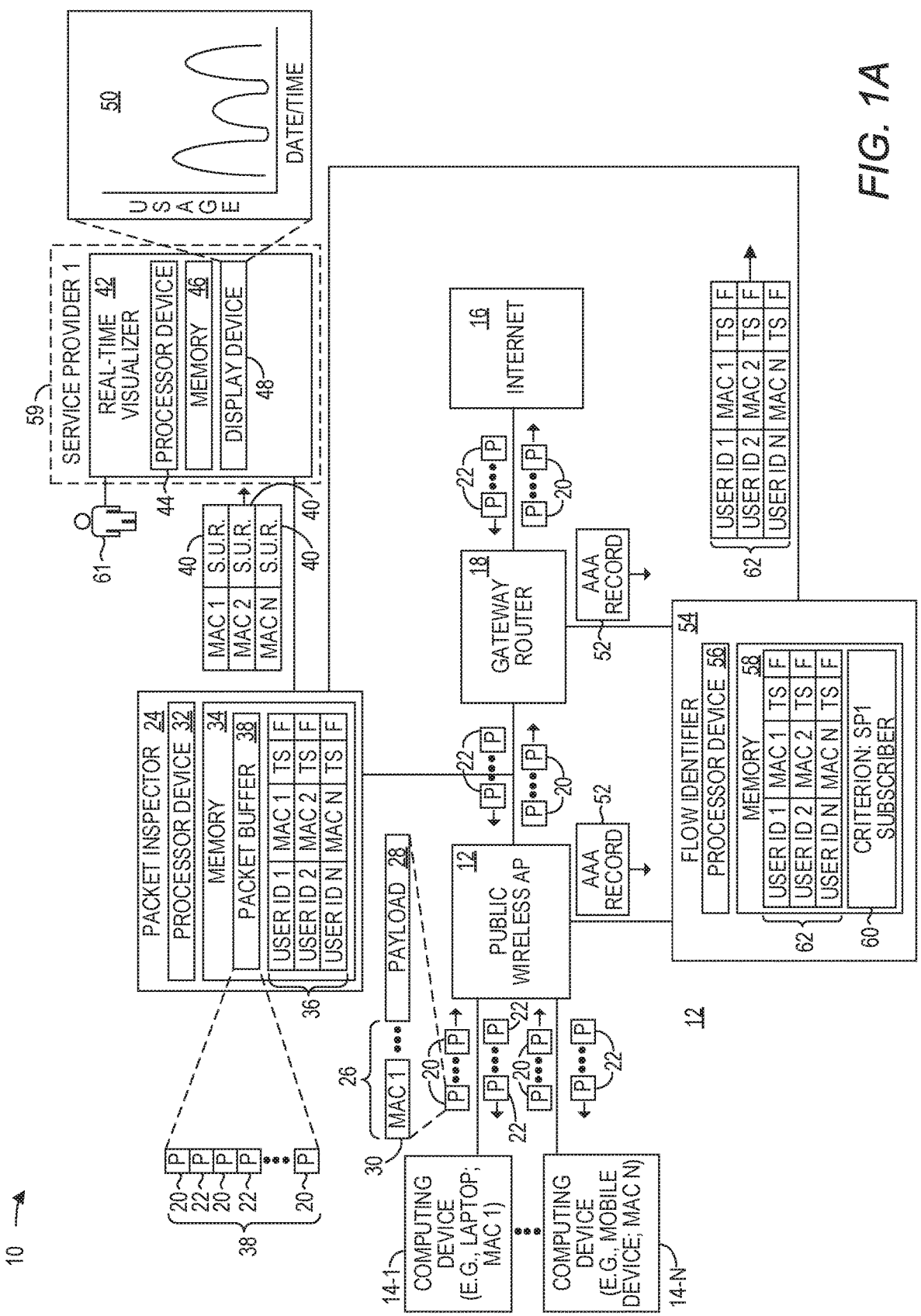
FIGS. 1A and 1B are block diagrams that illustrate an environment suitable for implementing real-time enrichment for deep packet inspection at different points in time, according to one embodiment.
Figure 1B:
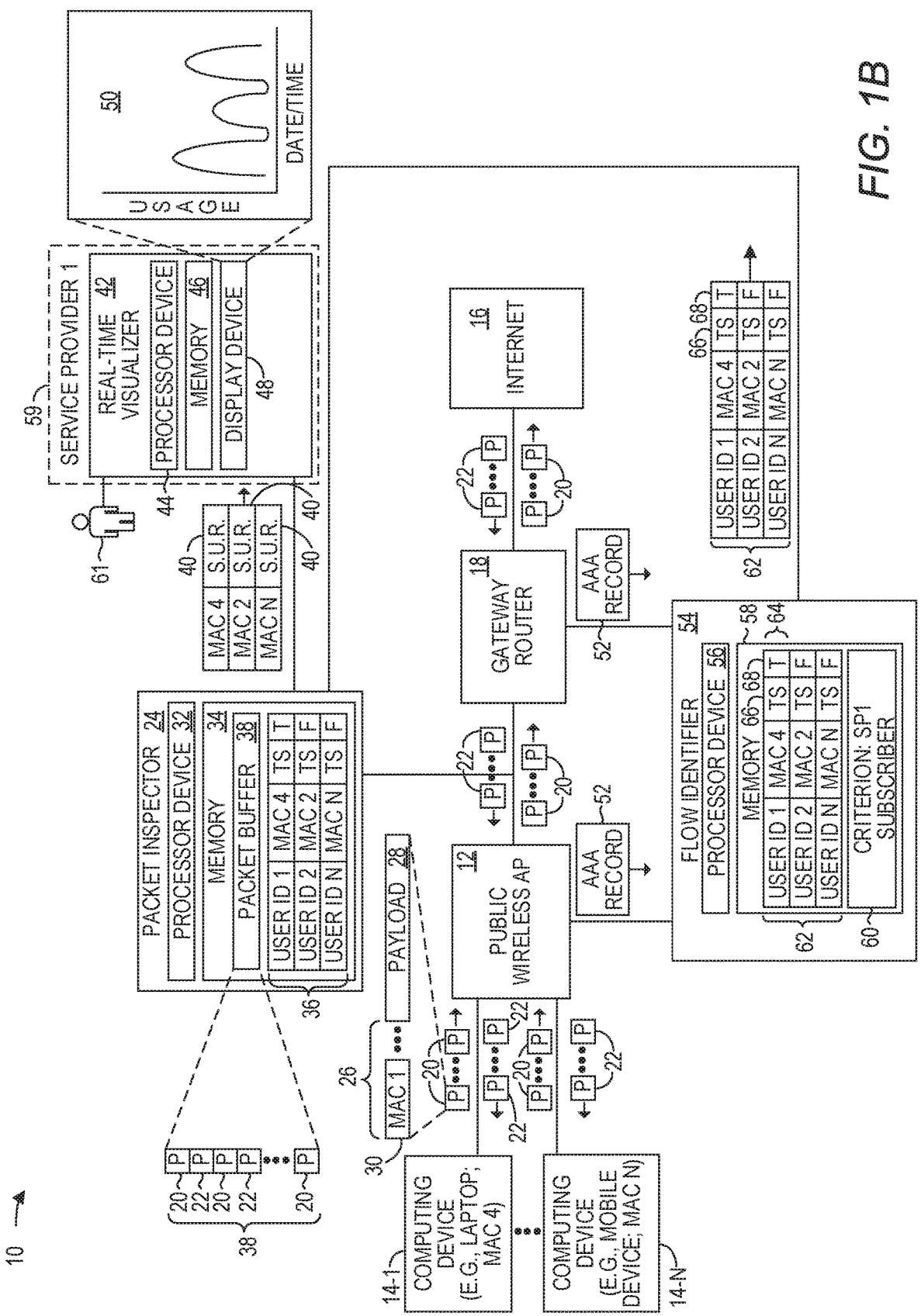

FIGS. 1A and 1B are block diagrams that illustrate an environment 10 suitable for implementing real-time enrichment for deep packet inspection at different points in time, according to one embodiment. Referring first to FIG. 1A, the environment 10 includes one or more public wireless access points (AP) 12 that facilitate communications between a plurality of computing devices 14-1-14-N (generally, computing devices 14) and other devices, such as computing devices on the internet 16. The word "public" in the phrase "public wireless AP" refers to a location of the wireless AP 12 that may allow any suitable computing device 14 that is capable of Wi-Fi communications, and if implemented, suitable credentials, to communicate with the wireless AP 12 and the internet 16. As an example, the wireless AP 12 may be located in an airport, a café, or on a street pole. There may be any number of computing devices 14 connected to the wireless AP 12, such as, by way of non-limiting example, tens, hundreds, or even thousands of computing devices 14.

The wireless AP 12 is typically communicatively coupled to a gateway router 18 that facilitates communications between the computing devices 14 and computing devices on other networks, such as the internet 16. It will be appreciated that there may be any number of intermediate devices between the gateway router 18 and the internet 16. It is noted that while, for purposes of illustration, only one public wireless AP 12 is illustrated as being connected to the gateway router 18, in practice, tens, hundreds or thousands of public wireless APs 12 may be connected to the gateway router 18.

The computing devices 14, once properly authenticated by the wireless AP 12 and/or the gateway router 18, send packets 20 to the wireless AP 12, which in turn communicates the packets 20 to the internet 16 via and through the gateway router 18. The computing devices 14 receive packets 22 from the internet 16 through the gateway router 18 and the wireless AP 12. A deep packet inspector 24 (hereinafter "packet inspector 24" for the sake of brevity) is coupled to a port of the gateway router 18 and monitors all packets 20 and 22 that travel through the gateway router 18, and selects and summarizes a subset of such packets 20 and 22, as discussed in greater detail below.

Each of the packets 20 and 22 contain a header portion 26 and a payload portion 28. The header portion 26 may comply with, for example, an 802.11 media access control (MAC) header format. The header portion 26 may also include, for example, an IPv4 or IPv6 packet header. The header portion 26 contains a device identifier 30, such as a MAC address of the computing device 14 that generated the packet 20, in this example, the computing device 14-1. The payload portion 28 contains the actual data being transferred in the packet 20. The payload portion 28 is typically what is of interest to the computing device to which the packet 20 is destined.

The packet inspector 24 includes a processor device 32 and a memory 34. The packet inspector 24 monitors the packets 20, 22 that travel through the gateway router 18 and selects a subset of the packets 20, 22 based on a criterion. In this example, the criterion is a particular device identifier. In particular, the packet inspector 24 selects the subset of packets 20, 22 that originate from or are destined to computing devices 14 that are identified in a data structure 36. The packet inspector 24 may temporarily store all packets 20, 22 communicated through the gateway router 18 in a packet buffer 38. The amount of time a packet 20, 22 may remain in the packet buffer 38 may be based on a size of the packet buffer 38, or a length of time a packet 20, 22 has been stored in the packet buffer 38.

The packet inspector 24 periodically generates summary usage records 40 for each computing device 14 identified in the data structure 36 based on the subset of packets 20, 22 selected for the respective computing device 14. The packet inspector 24 sends the summary usage records 40 to a destination, such as, by way of non-limiting example, a real-time visualizer 42. The summary usage records 40 may include, or be accompanied by, the device identifier of the computing device 14 to which the summary usage record 40 pertains. Examples of the content of summary usage records will be discussed in greater detail below. Thus, over time, the packet inspector 24 iteratively accesses the data structure 36, inspects the packets 20, 22 being communicated through the gateway router 18, generates summary usage records 40 that summarize network usage of the subset of computing devices 14 identified in the data structure 36, and sends the summary usage records 40 to the real-time visualizer 42.

The real-time visualizer 42 includes a processor device 44, a memory 46 and a display device 48. The real-time visualizer 42 receives the summary usage records 40 and generates output information 50 for presentation on the display device 48 to, for example, an operator 61. In this example, the output information 50 is a graph that identifies aggregate real-time network utilization of the computing devices 14 that are identified in the data structure 36. Additional examples of output information 50 generated based on the summary usage records 40 will be discussed in greater detail below.

The wireless AP 12 and the gateway router 18 include authentication, authorization and accounting (AAA) capabilities. The wireless AP 12 and the gateway router 18 generate AAA records 52 in response to actions of the computing devices 14. For example, in response to an authentication action taken by a computing device 14, the wireless AP 12 and the gateway router 18 may generate an authentication AAA record 52. As another example, periodically, in response to a computing device 14 transmitting and receiving packets 20, 22, respectively over some period of time, the wireless AP 12 and/or the gateway router 18 may generate usage AAA records 52 that identify a quantity of bytes transmitted, received, or both, by the respective computing device 14. The AAA records 52 include information about the computing device 14 to which the AAA record 52 pertains, such as a device identifier of the computing device 14.

Because the wireless AP 12 is public, the computing devices 14 may receive service, such as cellular service, via different service providers. For example, one computing device 14 may receive service via Verizon®, another from T-Mobile®, another from AT&T® and another from Charter Communications®. Thus, the AAA records 52 may pertain to computing devices 14 that receive service through a number of different service providers.

A flow identifier 54 includes a processor device 56 and a memory 58. The flow identifier 54 accesses the AAA records 52 or, as will be discussed in greater detail below, records generated based on the AAA records 52, and analyzes such records to identify certain device identifiers of computing devices 14 based on a criterion. The packet inspector 24, the flow identifier 54, and the real-time visualizer 42 may be operated by a particular service provider 59. The service provider 59 may desire to understand network usage of only those computing devices 14 that receive service from the service provider 59. The service provider 59 may, for example, desire to ensure that the network usage of those computing devices 14 is satisfactory. In this example, the flow identifier 54 accesses the AAA records 52 periodically, such as every second, every minute, every five minutes, every ten minutes, or the like, and based on one or more criteria 60. In this example, the criterion 60 is subscribers of the service provider 59 (e.g., service provider (SP) 1). Thus, the flow identifier 54 analyzes that subset of AAA records 52 that are determined to pertain to subscribers of the service provider 59.

The flow identifier 54, based on the criterion 60, generates device identifier information in the form of a data structure 62 that identifies that subset of the computing devices 14 that are transmitting packets 20 or receiving packets 22 via the wireless gateway router 18 and which receive service from the service provider 59. Mechanisms for identifying such computing devices 14 are discussed in greater detail below; however, in some embodiments, the flow identifier 54 may analyze authentication AAA records 52 generated in response to an authentication of a computing device 14, and which include information that identifies the service provider 59 as the service provider that provides the computing device 14 with service.

The flow identifier 54 periodically sends the data structure 62 to the packet inspector 24. The packet inspector 24 replaces, or updates, an existing data structure 36 to generate a new data structure 36 based on the received data structure 62 and now selects that subset of packets 20, 22 associated with the computing devices 14 identified in the new data structure 36. Thus, even as new computing devices 14 join the wireless AP 12, the packet inspector 24 is continuously provided (e.g., enriched with) real-time information identifying the device identifiers of those computing devices 14 to use for packet selection. Similarly, the real-time visualizer 42 continuously receives summary usage records 40 that identify network utilization of those computing devices 14 that obtain service from the service provider 59, allowing the operations staff of the service provider 59 to observe real-time network usage information of only the customers of the service provider 59.

Conventionally, certain device identifiers of a computing device, such as a MAC address, were static identifiers and did not change over time. Each manufacturer of a computer device allocated a unique MAC address to each computing device during manufacture of the computing device. Unfortunately, a static MAC address allows other computing devices to glean behavioral and other information about the computing device, and, by association, the user of the computing device. This has become a privacy concern. Consequently, certain operating systems, such as the Android® and IOS® operating systems, under certain circumstances provide a MAC randomization function, wherein the operating system randomizes a MAC address of a computing device. Thus, the same computing device 14, at different times, may have different MAC addresses. Accordingly, the data structure 36, which contains MAC addresses as the device identifier, and which is used by the packet inspector 24 to select a subset of the packets 20, 22, may become inaccurate over time due to MAC randomization.

FIG. 1B is a block diagram that illustrates the environment 10 at a subsequent point in time to that illustrated in FIG. 1A. In this example, the operating system of the computing device 14-1 has randomly changed the MAC address of the computing device 14-1 from MAC 1 to MAC 4. Such a change may result in a new AAA record 52, such as an authentication AAA record 52, that identifies the computing device 14-1 as a subscriber of the service provider 59 even though the MAC address has changed.

The flow identifier 54 accesses the new AAA record 52 and determines that the AAA record 52 pertains to a subscriber of the service provider 59 and adds a row 64 to an updated data structure 62 that identifies the MAC address "MAC 4" as a device identifier. The row 64 also includes a timestamp (TS) field 66 that identifies a time associated with the AAA record 52. The row 64 also includes a replacement field 68 that indicates whether this MAC address belongs to a computing device 14 that previously had a different MAC address and that was previously identified to the packet inspector 24. The flow identifier 54 may determine this information, for example, by maintaining a table of all MAC addresses and user identifiers previously provided to the packet inspector 24. In some implementations, the row 64 may also identify the previous MAC address of the computing device 14. The flow identifier 54 sends the updated data structure 62 to the packet inspector 24.

The packet inspector 24 receives the updated data structure 62 and replaces, or updates, the data structure 36 with the new information. The packet inspector 24, based on the replacement field 68 having a value of true (T), determines that the MAC address "MAC 4" is a replacement for a previous MAC address. The packet inspector 24 then analyzes packets 20, 22 in the packet buffer 38 to identify any packets 20, 22 that have a MAC address of MAC 4 and that have a timestamp equal to or later than the timestamp identified in the TS field 66 since, prior to receiving the updated data structure 62, the packet inspector 24 would not have selected such packets but possibly could have stored packets having the MAC address of MAC 4. The packet inspector 24 generates a summary usage record 40 based on such packets 20, 22, and sends the summary usage record 40 to the real-time visualizer 42. In this manner, the flow identifier 54 detects not only the current computing devices 14 that are associated with the particular subscriber, but also detects those computing devices 14 who were previously identified as being associated with the particular subscriber, but which have changed their MAC address. The flow identifier 54 continually enriches the packet inspector 24 with the updated data structure 62 to ensure that the packet inspector 24 is selecting the appropriate packets 20, 22, as well as ensuring the packet inspector 24 looks back in time in the case of a MAC address change to identify packets 20, 22 that were previously not selected by the packet inspector 24.

Figure 2:
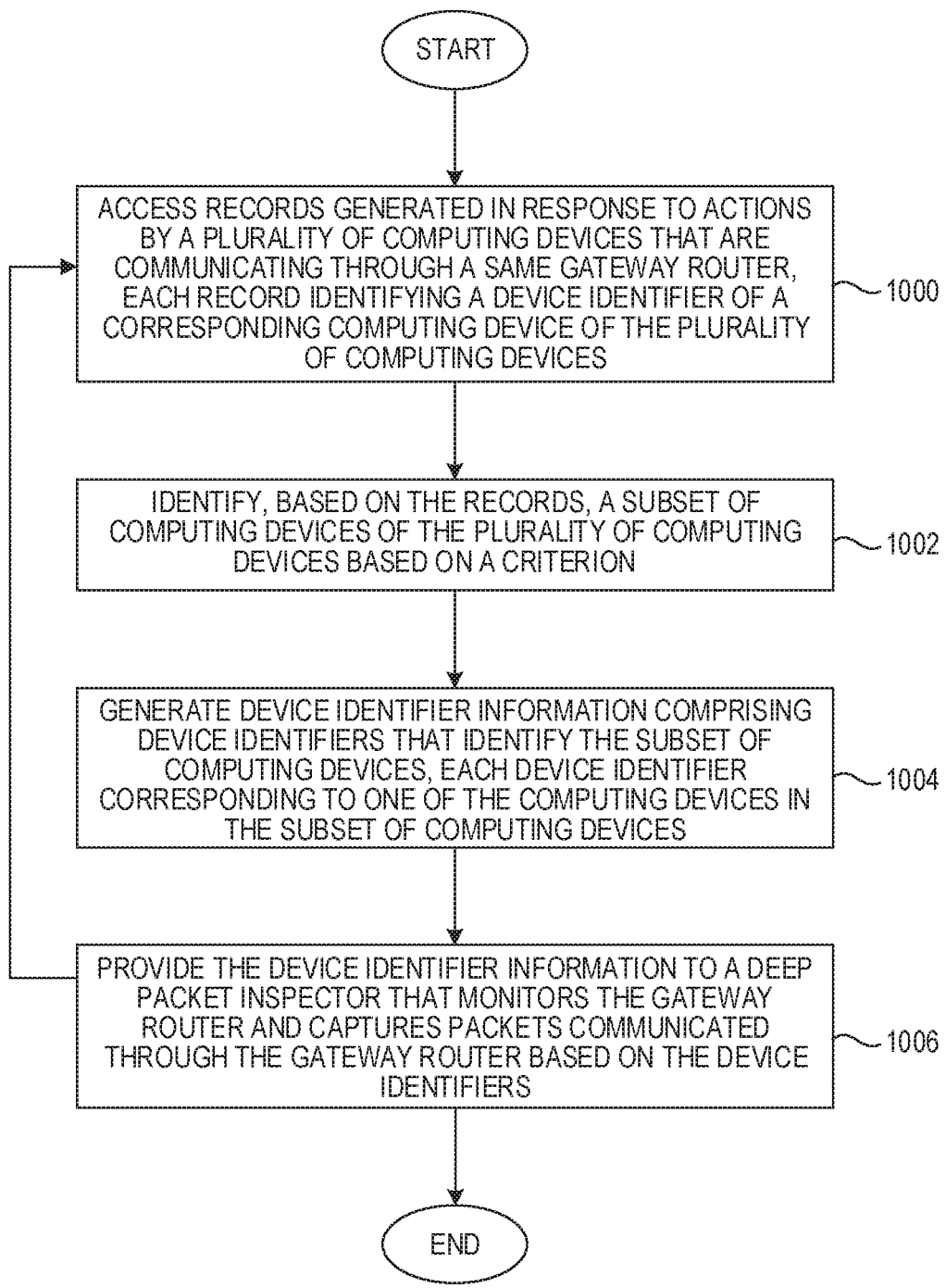
FIG. 2 is a flowchart of a method for real-time enrichment for deep packet inspection according to one embodiment.

FIG. 2 is a flowchart of a method for real-time enrichment for deep packet inspection according to one embodiment. FIG. 2 will be discussed in conjunction with FIG. 1A. The flow identifier 54 accesses the AAA records 52 generated in response to actions by the plurality of computing devices 14 that are communicating through the same gateway router 18, each AAA record 52 identifying a device identifier, such as a MAC address, of a corresponding computing device 14 of the plurality of computing devices 14 (FIG. 2, block 1000). The flow identifier 54 identifies, based on the AAA records 52, a subset of computing devices 14 of the plurality of computing devices 14 based on the criterion 60 (FIG. 2, block 1002). The flow identifier 54 generates device identifier information, in this embodiment, in the form of the data structure 62, comprising device identifiers that identify the subset of computing devices 14, each device identifier corresponding to one of the computing devices 14 in the subset of computing devices 14 (FIG. 2, block 1004). The flow identifier 54 provides the device identifier information to the packet inspector 24 that monitors the gateway router 18 and captures packets 20, 22 communicated through the gateway router 18 based on the device identifiers (FIG. 2, block 1006).

The process is iterative, and thus the flow identifier 54 iteratively, such as periodically for example, performs blocks 1000-1006, each iteration. Each iteration, the flow identifier 54 may access only those AAA records 52 that have been generated since the previous iteration.

Figure 3:
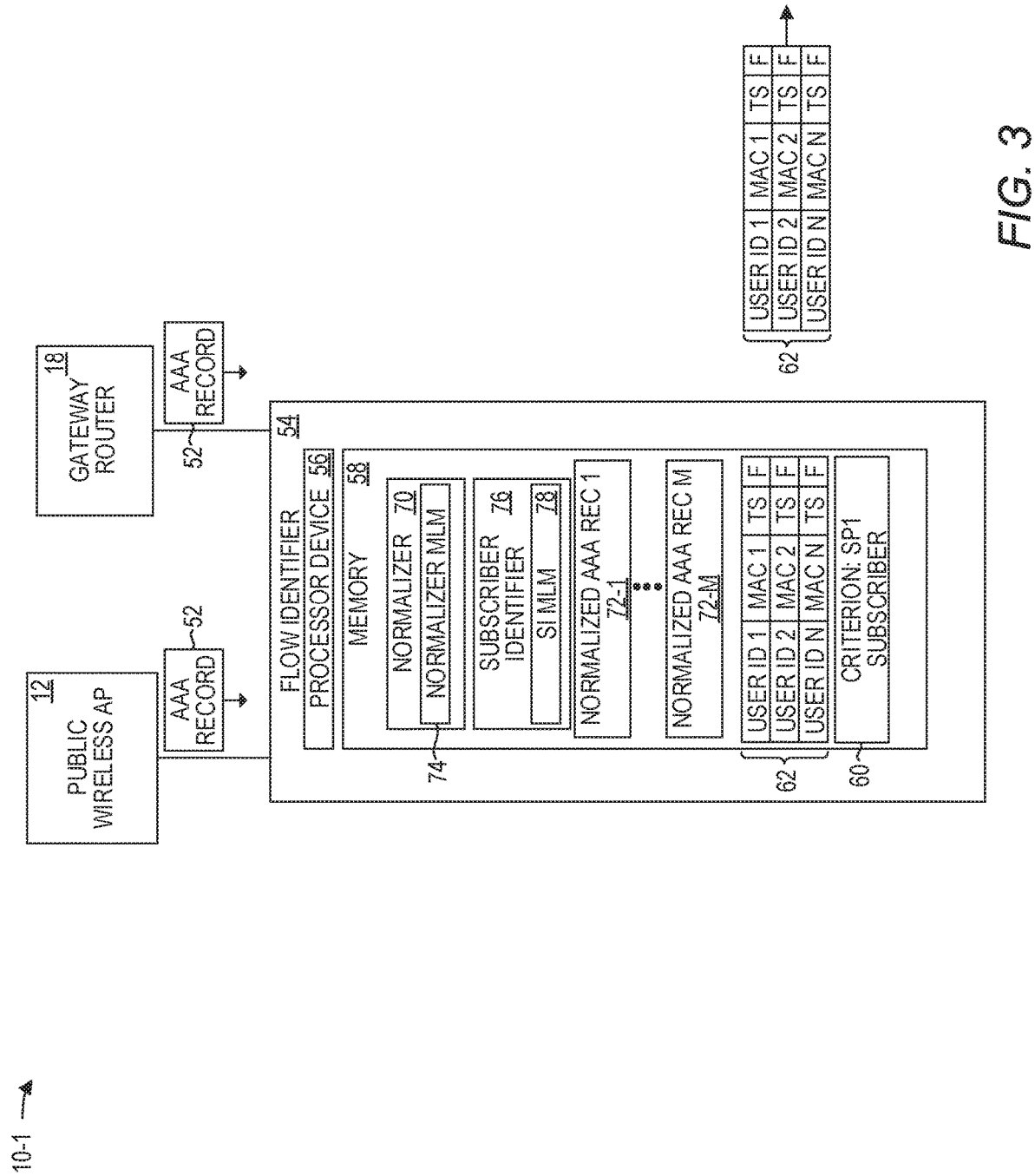
FIG. 3 is a block diagram of an environment suitable for implementing real-time enrichment for deep packet inspection according to another embodiment.

FIG. 3 is a block diagram of an environment 10-1 suitable for implementing real-time enrichment for deep packet inspection according to another embodiment. The environment 10-1 is substantially similar to the environment 10, except as otherwise discussed herein. Solely for space reasons, FIG. 3 has omitted many of the elements of FIGS. 1A and 1B that are not pertinent to the discussion; however, such omitted elements would exist in the environment 10-1 in operation. In this embodiment, the AAA records 52 may have different formats and may come from multiple different elements. The AAA records 52 may not all be created by a single service provider, and thus may be formatted differently, and may not contain identical fields in the same location. For example, the service provider 59 may have agreements with other service providers that allow subscribers of the service provider 59 to access public wireless networks of the other service providers, and vice versa. Such other service providers may provide the flow identifier 54 with AAA records 52 for such subscribers that are formatted differently from those generated by the public wireless AP 12 and the gateway router 18 of the service provider 59 simply because the other service providers utilize different formats. In this embodiment, the flow identifier 54 includes a normalizer 70 that processes the AAA records 52, and generates a plurality of normalized AAA records 72-1-72-M, which all contain identical fields in identical locations. In some embodiments, the flow identifier 54 includes a normalizer machine-learned model (MLM) 74, such as, by way of non-limiting example, a neural network, that identifies fields of data in the AAA records 52 based on the content of such fields, even though the data may be formatted differently in different AAA records 52. Examples of such fields are discussed below with regard to FIG. 4. The normalizer 70 uses this information to generate the normalized AAA records 72-1-72-M.

The flow identifier 54 also includes a subscriber identifier 76 that analyzes the normalized AAA records 72 to generate the data structure 62. As noted above, at times a MAC randomization of a computing device 14 may be accompanied by an authentication AAA record 52. However, at times a MAC randomization of a computing device 14 may not result in an authentication AAA record 52, and thus there may be no corresponding normalized AAA record 72. In such circumstances, the subscriber identifier 76 cannot rely on the existence of an authorization AAA record 52 to determine that a MAC randomization has occurred, and instead detects the MAC randomization based on other types of AAA records 52, such as data usage AAA records 52. In some embodiments, the subscriber identifier 76 includes, or is communicatively coupled to, a subscriber identifier MLM 78 that has been trained to detect the existence of a new MAC address in a normalized AAA record 72, and whether the new MAC address is a randomized MAC address that belongs to a computing device 14 that was previously identified with a different MAC address. The subscriber identifier MLM 78 may be provided a group of AAA records 52 and output the data structure 62 that identifies that subset of the computing devices 14 that are transmitting packets 20 or receiving packets 22 via the wireless gateway router 18 and which receive service from the service provider 59. The data structure 62 may also identify those device identifiers that replace a previous device identifier due to MAC randomization.

Figure 4:
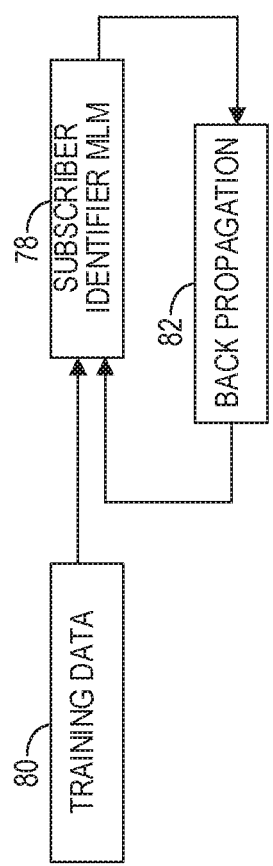
FIG. 4 is a block diagram that illustrates a process for training a subscriber identifier machine-learned model according to one embodiment.

FIG. 4 is a block diagram that illustrates a process for training the subscriber identifier MLM 78 according to one embodiment. Training data 80 is provided to the subscriber identifier MLM 78 in conjunction with a back propagation function 82 to train the subscriber identifier MLM 78 to detect new computing devices 14 that communicate through the gateway router 18, and to detect whether a newly identified MAC address corresponds to a new computing device 14 or to a previously identified computing device 14. In some implementations, the AAA records 52 (and where such AAA records 52 are normalized, the normalized AAA records 72) may include one more of the following data:

"event time" time that the AAA record 52 is created;
"ap_mac"—the unchanging MAC address of the access point, such as the wireless AP 12, being used;
"session_id"—Layer 3 (internet protocol (IP)) session;
"client_mac"—MAC address of computing device 14 to which the AAA record 52 pertains;
"nas"—the name of the network element that originally created the AAA record 52. This is typically the access point, gateway router or broadband remote access server that handled the session usually;
"user_id";
"user_id_attributes"—authenticated identity, if known;
"authen"—authentication flag. Indicates the requested authentication policy;
"rr_customer_type"—customer type as recognized by the policy service;
"rr_customer_id"—this indicates that the authenticating database provided the customer id and account id of the subscriber's residential account;
"rr_account_id"—this indicates that the authenticating database provided the customer id and account id of the subscriber's residential account;
"rr_alternate_id"—this indicates that the authenticating database provided the customer id and account id of the subscriber's residential account with an alternate id;

"latitude"—initial location of the usage event;
"longitude"—initial location of the usage event; and
"mounting_type"—type of access point, if known.

The training data 80 comprises records having the fields discussed above. The training data 80 may comprise actual AAA records 52 or normalized AAA records 72. The back propagation function 82 provides feedback regarding the accuracy of the predictions of the subscriber identifier MLM 78 so that the subscriber identifier MLM 78 becomes increasingly accurate during the training process. At a desired level of accuracy, the subscriber identifier MLM 78 may be placed into operation.

FIG. 5 is a block diagram of a summary usage record format 84 that may be utilized for a summary usage record 40 according to one embodiment. The packet inspector 24 may generate summary usage records at any desired interval or upon any desired event. In some embodiments, the packet inspector 24 generates a summary usage record for each layer 4 (TCP) connection, and the summary usage record is generated upon the termination of such layer 4 connection, and aggregates network usage during the lifespan of such layer 4 connection. The summary usage record format 84 contains a plurality of fields 86-1-86-10. A timestamp field 86-1 contains a timestamp of the time that the respective summary usage record 40 was generated. A device name field 86-2 contains a device name of the wireless AP via which the respective computing device has connected to the network. An AP IP address field 86-3 contains the IP address of the wireless AP via which the respective computing device has connected to the network. An AP MAC address field 86-4 identifies the MAC address of the wireless AP via which the respective computing device has connected to the network. A MAC address field 86-5 identifies the MAC address of the respective computing device. An application field 86-6 identifies the application being used by the respective computing device, such as, by way of non-limiting example, Netflix®, downloadable content (DLC), hypertext transfer protocol secure (HTTPS), or DNS-ANY-CAST-V4. A packet type field 86-7 identifies a type of packet, such as, by way of non-limiting example, transmission control protocol (TCP), L2, or user datagram protocol (UDP). A download bytes count field 86-8 identifies an amount of downloaded bytes by the respective computing device. An upload bytes count field 86-9 identifies an amount of uploaded bytes by the respective computing device. A retransmitted packets field 86-10 identifies a number of packets that have been retransmitted to the respective computing device.

In some embodiments, the summary usage record format 84 may include one or more additional fields, such as a Total Effective Upload Bytes for the Session field, a Total Effective Download Bytes for the Session field, a Total Upload Packet Retransmissions for the Session field, a Total Download Packet Retransmissions for the Session field, an Upload Active Milliseconds for the Session field, a Download Active Milliseconds for the Session field, a Peak Upload Round Trip Time for the Session field, a Peak Download Round Trip Time for the Session field, and a Protocol Requests/Successes/Failures/Timeouts for the Session field.

A downstream application, such as the real-time visualizer 42 receives the summary usage records 40, and utilizes the information contained in the summary usage records 40 to provide output information 50 regarding network utilization of the network by the subscribers of the service provider 59. As illustrated in FIG. 1, one such output information 50 is a graph that identifies aggregate real-time network utilization of the computing devices 14 that are identified in the data structure 36.

Figure 6:
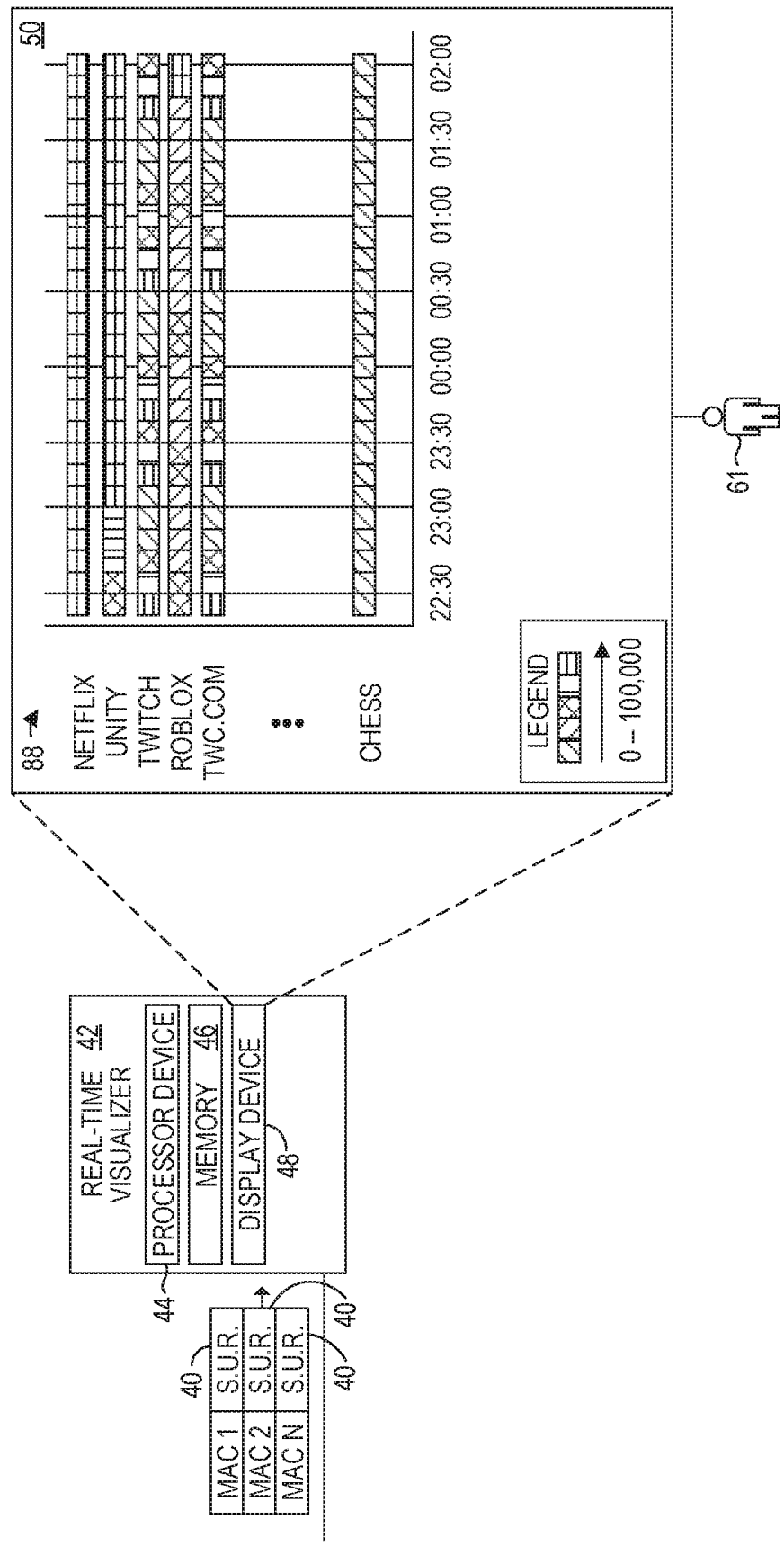
FIG. 6 illustrates output information that may be generated by a real-time visualizer based on summary usage records, according to one embodiment.

FIG. 6 illustrates additional output information 50, as discussed above with regard to FIG. 1, that may be generated by the real-time visualizer 42 based on the summary usage records 40. It should be noted that while, for purposes of explanation, FIG. 1 illustrated a single gateway router 18, in operation, for a large service provider, the real-time visualizer 42 may receive summary usage records 40 from hundreds or thousands of gateway routers 18 located throughout a geographic area, such as a city, a state, or an entire country. For example, the service provider 59 may have tens, hundreds, or thousands of access points 12 throughout the United States, and may have tens or hundreds of gateway routers 18 to which such access points 12 are communicatively coupled. In such example, the real-time visualizer 42 may receive summary usage records 40 from tens or hundreds of different packet inspectors 24, each of which is coupled to and monitors traffic that passes through one of the gateway routers 18.

In this example, the real-time visualizer 42 receives the summary usage records 40 from the packet inspector 24 and analyzes which computing devices 14 are utilizing which applications. The real-time visualizer 42 generates a heat map illustrating the real-time application usage of all the computing devices 14 that are subscribers of the service provider 59. The real-time visualizer 42 may utilize various colors, or shades of the same color, to visually depict concurrent usage of an application. For example, the real-time visualizer 42 may utilize a dark blue to indicate greater than 100,000 subscribers are currently utilizing an application, a lighter shade of blue to indicate 50,000 to 99,999 subscribers are currently utilizing an application, an even lighter shade of blue to indicate 10,000 to 49,999 subscribers are currently utilizing an application, and the like. The real-time visualizer 42 may concurrently display real-time data along with historical data in a graph 88 on the display device 48 for presentation to the operator 61. In this manner, the operator 61 can quickly ascertain what applications the subscribers of the service provider 59 are using, and the numbers of subscribers that are using which applications.

Figure 7:
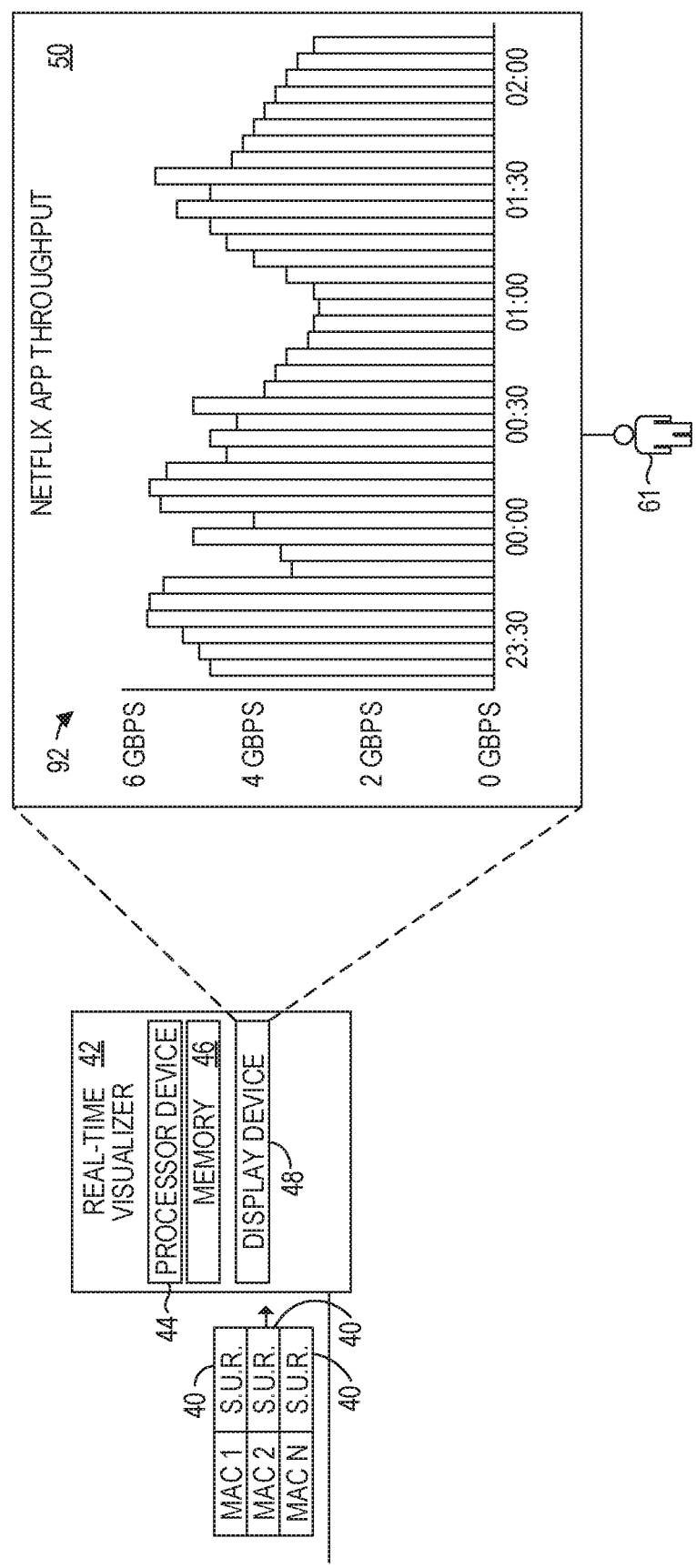
FIG. 7 illustrates additional output information that may be generated by a real-time visualizer based on summary usage records, according to another embodiment.

FIG. 7 illustrates additional output information 50, as discussed above with regard to FIG. 1, that may be generated by the real-time visualizer 42 based on the summary usage records 40. In this example, the real-time visualizer 42 receives the summary usage records 40 from the packet inspector 24 and analyzes throughput for a particular application, in this example, the Netflix® application. The real-time visualizer 42 generates a graph 92 that illustrates real-time throughput for the subscribers of the service provider 59, both in real-time, and for a period of time in the past.

Figure 8:
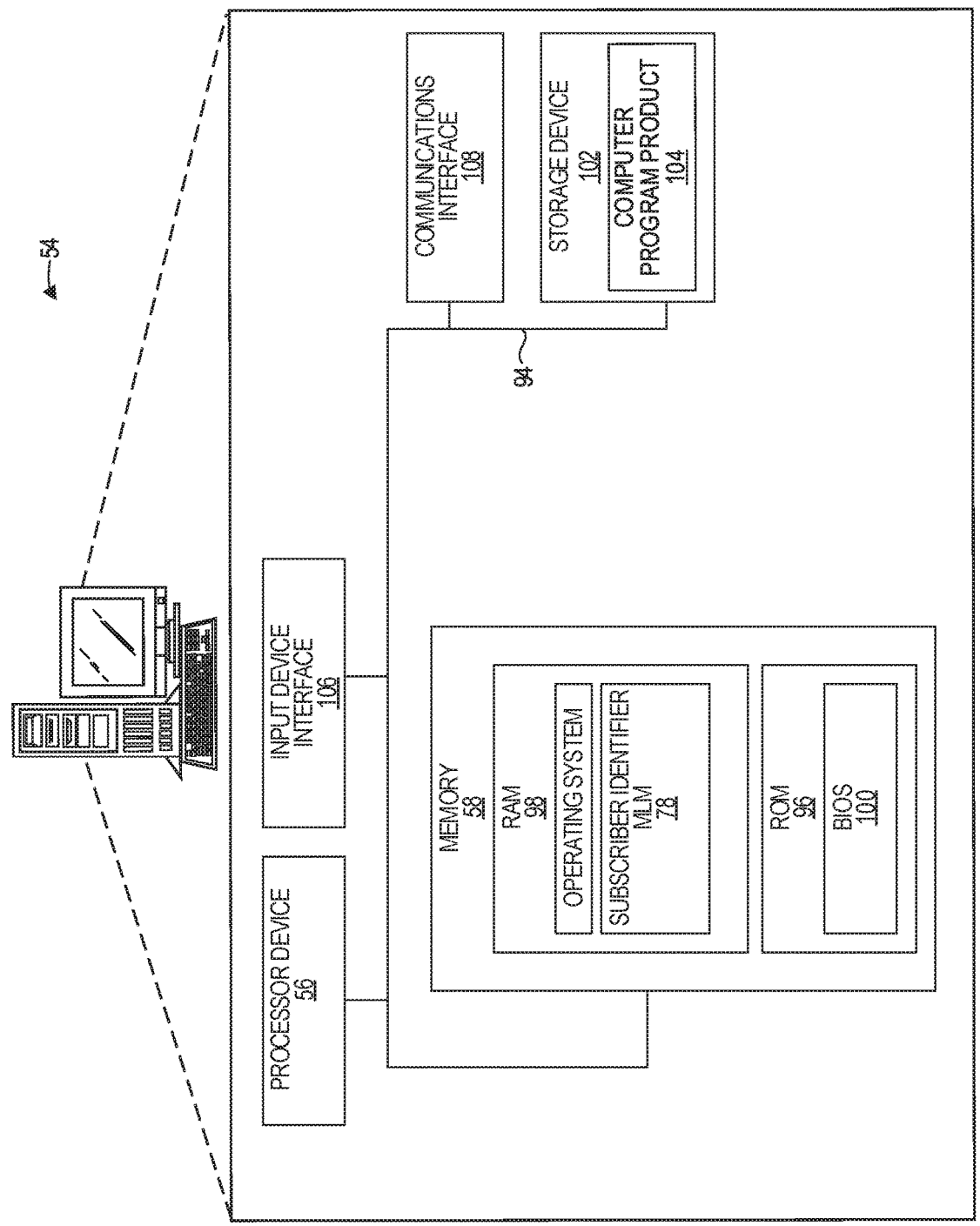
FIG. 8 is a block diagram of a flow identifier suitable for implementing embodiments.

FIG. 8 is a block diagram of the flow identifier 54 suitable for implementing examples according to one example. The flow identifier 54 may comprise any computing or electronic device capable of including firmware, hardware, and/or executing software instructions to implement the functionality described herein, such as a computer server, a desktop computing device, a laptop computing device, a smartphone, a computing tablet, or the like. The flow identifier 54 includes the processor device 56, the memory 58, and a system bus 94. The system bus 94 provides an interface for system components including, but not limited to, the memory 58 and the processor device 56. The processor device 56 can be any commercially available or proprietary processor.

In some embodiments, the flow identifier 54 may be implemented in software and comprise software instructions which, when executed by the processor device 56, implement the functionality disclosed herein.

The system bus 94 may be any of several types of bus structures that may further interconnect to a memory bus (with or without a memory controller), a peripheral bus, and/or a local bus using any of a variety of commercially available bus architectures. The memory 58 may include non-volatile memory 96 (e.g., read-only memory (ROM), erasable programmable read-only memory (EPROM), electrically erasable programmable read-only memory (EEPROM), etc.), and volatile memory 98 (e.g., random-access memory (RAM)). A basic input/output system (BIOS) 100 may be stored in the non-volatile memory 96 and can include the basic routines that help to transfer information between elements within the flow identifier 54. The volatile memory 98 may also include a high-speed RAM, such as static RAM, for caching data.

The flow identifier 54 may further include or be coupled to a non-transitory computer-readable storage medium such as a storage device 102, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 102 and other drives associated with computer-readable media and computer-usable media may provide non-volatile storage of data, data structures, computer-executable instructions, and the like.

A number of modules can be stored in the storage device 102 and in the volatile memory 98, including an operating system and one or more program modules, such as the subscriber identifier machine-learned model 78, which may implement the functionality described herein in whole or in part.

All or a portion of the embodiments disclosed herein may be implemented as a computer program product 104 stored on a transitory or non-transitory computer-usable or computer-readable storage medium, such as the storage device 102, which includes complex programming instructions, such as complex computer-readable program code, to cause the processor device 56 to carry out the steps described herein. Thus, the computer-readable program code can comprise software instructions for implementing the functionality of the examples described herein when executed on the processor device 56.

The operator 61 may also be able to enter one or more configuration commands through a keyboard (not illustrated), a pointing device such as a mouse (not illustrated), or a touch-sensitive surface such as the display device 48. Such input devices may be connected to the processor device 56 through an input device interface 106 that is coupled to the system bus 94 but can be connected by other interfaces such as a parallel port, an Institute of Electrical and Electronic Engineers (IEEE) 1394 serial port, a Universal Serial Bus (USB) port, an IR interface, and the like. The flow identifier 54 may also include a communications interface 108, such as an Ethernet transceiver, suitable for communicating with other elements, such as the wireless AP 12, the gateway router 18, and the packet inspector 24, as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
iteratively, by a processor device:
accessing records generated in response to actions by a plurality of computing devices that are communicating through a same gateway router, each record identifying a device identifier of a corresponding computing device of the plurality of computing devices;
identifying, based on the records, a subset of computing devices of the plurality of computing devices based on a criterion;
generating device identifier information comprising device identifiers that identify the subset of computing devices, each device identifier corresponding to one of the computing devices in the subset of computing devices; and
providing the device identifier information to a deep packet inspector that monitors the gateway router and captures packets communicated through the gateway router based on the device identifiers, wherein the device identifier information comprises an indicator, for at least one device identifier identified in the device identifier information, that indicates that the at least one device identifier replaces a device identifier previously provided in previous device identifier information to the deep packet inspector.

2. The method of claim 1 wherein the device identifiers comprise media access control (MAC) addresses of the corresponding computing devices.

3. The method of claim 1 wherein accessing the records comprises accessing a data structure comprising the records.

4. The method of claim 1 further comprising generating, by an authentication module, a record of the records in response to an authentication of a computing device of the plurality of computing devices.

5. The method of claim 1 wherein the criterion is whether a computing device is associated with a subscriber of a particular service provider of a plurality of different service providers.

6. The method of claim 1 wherein generating the device identifier information comprising the device identifiers that identify the subset of computing devices comprises providing each record to a machine-learned model that was trained based on a plurality of training records to identify records that match the criterion.

7. The method of claim 6 further comprising:
outputting, by the machine-learned model, the device identifier information comprising the device identifiers, wherein each device identifier comprises a MAC address.

8. The method of claim 1 further comprising:
iteratively:
accessing, by the deep packet inspector, the device identifier information;
inspecting, by the deep packet inspector in real-time, the packets being communicated through the gateway router;
generating, by the deep packet inspector, based on content of the packets that contain a device identifier that is identified in the device identifier information, a plurality of summary usage records that summarizes network usage associated with the packets; and
sending the plurality of summary usage records to a destination.

9. The method of claim 8 further comprising:
receiving, by a visualizer from the deep packet inspector, the plurality of summary usage records;
generating, based on the plurality of summary usage records, a graph that identifies aggregate real-time network usage of the subset of computing devices; and
presenting, on a display device, the graph.

10. The method of claim 8 further comprising:
receiving, by a visualizer from the deep packet inspector, the plurality of summary usage records;
generating, based on the plurality of summary usage records, a graph that identifies aggregate real-time network throughput of a particular application by the subset of computing devices; and
presenting, on a display device, the graph.

11. A computing device, comprising:
a memory; and
a processor device coupled to the memory to:
iteratively:
access records generated in response to actions by a plurality of computing devices that are communicating through a same gateway router, each record identifying a device identifier of a corresponding computing device of the plurality of computing devices;
identify, based on the records, a subset of computing devices of the plurality of computing devices based on a criterion;
generate device identifier information comprising device identifiers that identify the subset of computing devices, each device identifier corresponding to one of the computing devices in the subset of computing devices; and
provide the device identifier information to a deep packet inspector that monitors the gateway router and captures packets communicated through the gateway router based on the device identifiers, wherein the device identifier information comprises an indicator, for at least one device identifier identified in the device identifier information, that indicates that the at least one device identifier replaces a device identifier previously provided in previous device identifier information to the deep packet inspector.

12. The computing device of claim 11 wherein the device identifiers comprise media access control (MAC) addresses of the corresponding computing devices.

13. The computing device of claim 11 wherein at least some of the records comprise authentication records generated in response to an authentication of a computing device of the plurality of computing devices.

14. The computing device of claim 11 wherein the criterion is whether a computing device is associated with a subscriber of a particular service provider of a plurality of different service providers.

15. The computing device of claim 11 wherein to generate the device identifier information comprising the device identifiers that identify the subset of computing devices, the processor device is further configured to provide each record to a machine-learned model that was trained based on a plurality of training records to identify records that match the criterion.

16. A non-transitory computer-readable storage medium that includes executable instructions configured to cause a processor device to:
iteratively:
access records generated in response to actions by a plurality of computing devices that are communicating through a same gateway router, each record identifying a device identifier of a corresponding computing device of the plurality of computing devices;
identify, based on the records, a subset of computing devices of the plurality of computing devices based on a criterion;
generate device identifier information comprising device identifiers that identify the subset of computing devices, each device identifier corresponding to one of the computing devices in the subset of computing devices; and
provide the device identifier information to a deep packet inspector that monitors the gateway router and captures packets communicated through the gateway router based on the device identifiers, wherein the device identifier information comprises an indicator, for at least one device identifier identified in the device identifier information, that indicates that the at least one device identifier replaces a device identifier previously provided in previous device identifier information to the deep packet inspector.

17. The non-transitory computer-readable storage medium of claim 16 wherein the device identifiers comprise media access control (MAC) addresses of the corresponding computing devices.

18. The non-transitory computer-readable storage medium of claim 16 wherein the criterion is whether a computing device is associated with a subscriber of a particular service provider of a plurality of different service providers.

19. The non-transitory computer-readable storage medium of claim 16 wherein to generate the device identifier information comprising the device identifiers that identify the subset of computing devices, the instructions are further configured to cause the processor device to provide each record to a machine-learned model that was trained based on a plurality of training records to identify records that match the criterion.

* * * * *